A. R. WEAVER.
VEHICLE WHEEL.
APPLICATION FILED FEB. 17, 1910.
1,053,332.
Patented Feb. 18, 1913.
2 SHEETS—SHEET 1.
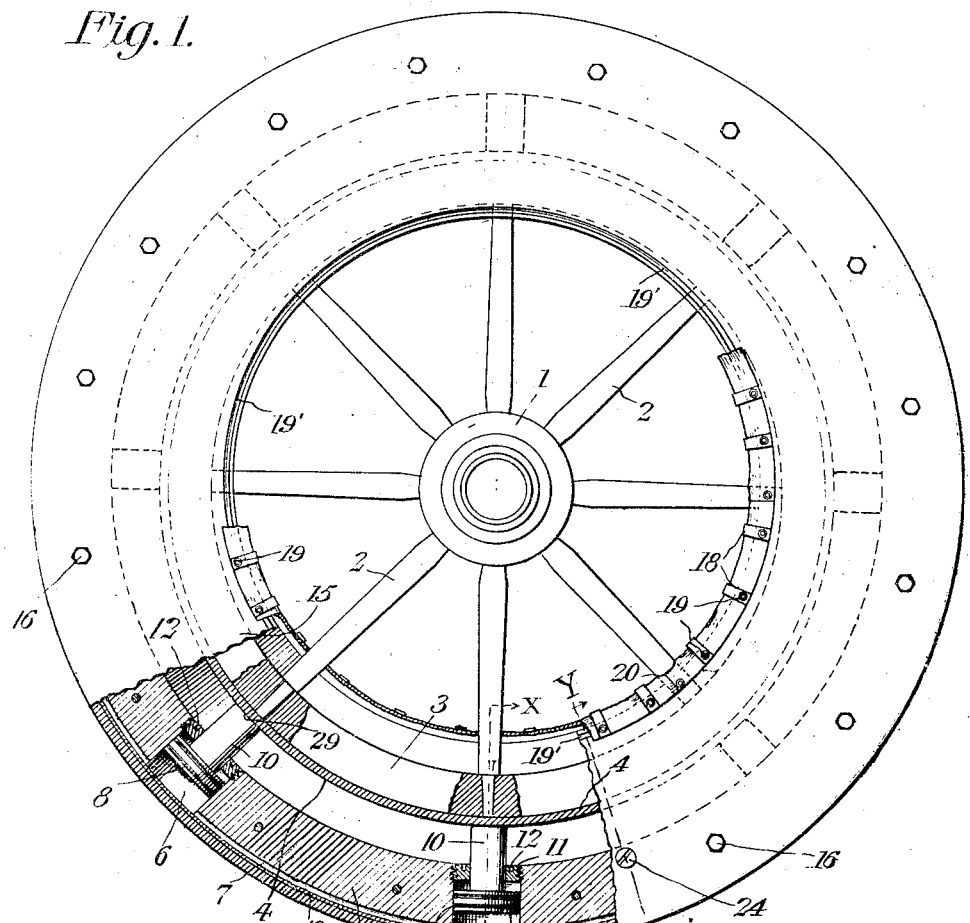
Fig. 1.
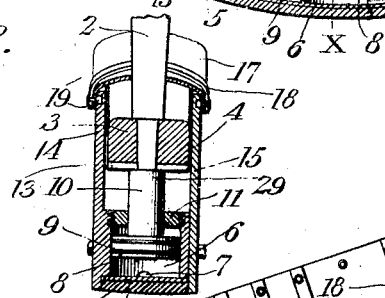
Fig. 2.
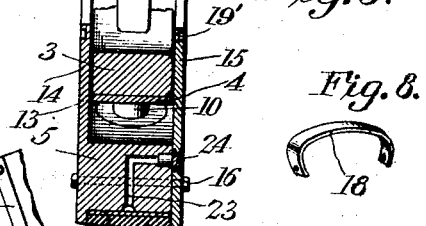
Fig. 3.
Fig. 6.
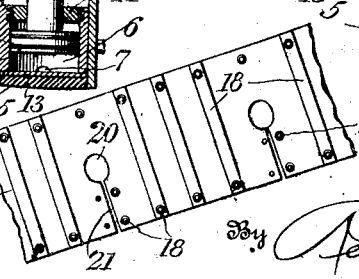
Fig. 4.
Witnesses
Inventor
Allen R. Weaver
By Rexford N. Smith,
Attorney.

A. R. WEAVER.
VEHICLE WHEEL.
APPLICATION FILED FEB. 17, 1910.
1,053,332.
Patented Feb. 18, 1913.
2 SHEETS—SHEET 2.
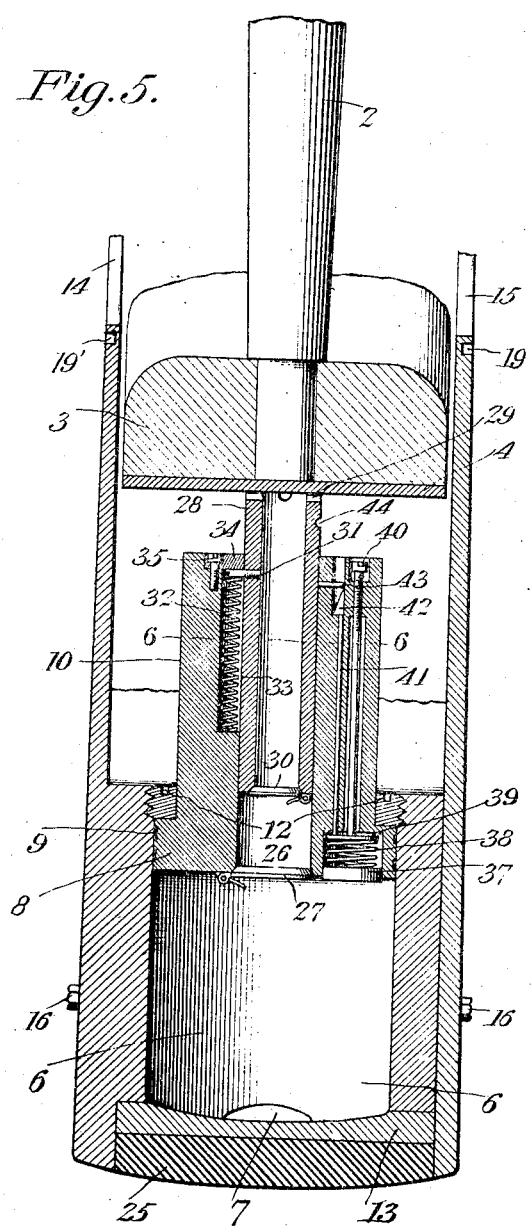
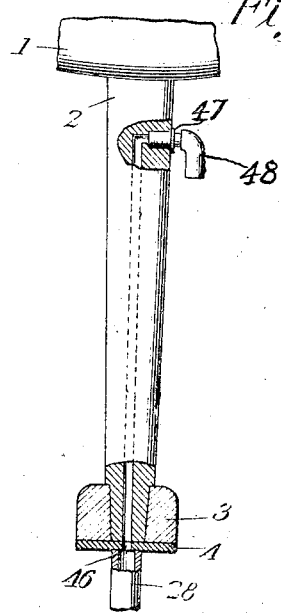
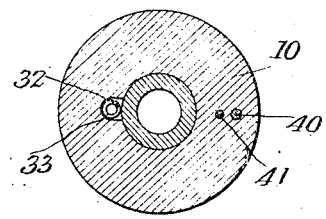
Witnesses
Fenton S Belt
Harry King
Inventor
Allen R. Weaver
By Rexford M. Smith
Attorney

UNITED STATES PATENT OFFICE.

ALLEN R. WEAVER, OF BATESVILLE, ARKANSAS.

VEHICLE-WHEEL.

1,053,332.

Specification of Letters Patent.    Patented Feb. 18, 1913.

Application filed February 17, 1910.  Serial No. 544,386.

*To all whom it may concern:*

Be it known that I, ALLEN R. WEAVER, a citizen of the United States, residing at Batesville, in the county of Independence and State of Arkansas, have invented a certain new and useful Vehicle-Wheel, of which the following is a specification, reference being had therein to the accompanying drawing.

This invention relates to vehicle wheels, the object of the invention being to provide a practical and durable substitute for the ordinary rubber pneumatic tire now in common use, the improvements being applicable to any ordinary vehicle wheel and the construction thereof reducing to a minimum the liability to puncture the tire, the danger of puncturing being practically eliminated and the wear and tear on the tire as a whole reduced to a minimum.

With the above and other objects in view, the nature of which will more fully appear as the description proceeds, the invention consists in the novel construction, combination and arrangement of parts herein fully described, illustrated and claimed.

In the accompanying drawings:—Figure 1 is a side elevation showing the improved tire applied to a vehicle wheel, said view being partly broken out in section to better illustrate the construction of the tire and the relation thereof to the wheel. Fig. 2 is a vertical cross section on the line X—X of Fig. 1. Fig. 3 is also a vertical cross section on the line Y—Y of Fig. 1. Fig. 4 is a plan view of a fragment of the flexible apron or guard. Fig. 5 is an enlarged vertical cross section taken in line with the center of one of the pistons, showing the arrangement of the pump mechanism. Fig. 6 is a cross section on line 6—6 of Fig. 5. Fig. 7 is a side elevation of one of the spokes of the wheel, the same being partly broken away in section. Fig. 8 is a detail view of one of the guard reinforcing straps.

Referring to the drawings, 1 designates the hub of an ordinary wheel, 2 the spokes thereof, 3 the wheel rim or felly and 4 what will be hereinafter termed the inner tire.

The construction and arrangement of the parts just described are of the common and usual form.

The improved tire embodies an annular tire body 5 which is formed at intervals with cylinders or piston chambers 6. Any desired number of these piston chambers may be provided and they are all connected or placed in communication with each other by means of pressure equalizing circumferential passages or air ducts 7 so that a common pressure may be maintained in all of the piston chambers.

Mounted to reciprocate in each piston chamber is a piston 8 provided with the usual piston rings 9 to secure a tight fit and joint and each piston is provided with a rod 10 which extends radially inward with respect to the axis of the wheel and passes slidably through a guide bushing 11 which is threaded into the inner end of the piston chamber as clearly shown in the drawings and provided with a suitable number of spanner sockets 12 so that said bushing may be removed and replaced with the aid of a spanner or other suitable implement. The inner tire 4 is supported, as clearly illustrated in Figs. 1, 2 and 3, upon the inner extremities of all of the piston rods 10.

The tire body 5 is provided with oppositely arranged flanges 14 and 15, one of said flanges being preferably formed as an integral part of the tire body while the other flange 15 is preferably formed separately as illustrated in Figs. 2 and 3 and fastened in place by a suitable number of bolts or like fasteners 16.

17 designates a flexible apron or guard of canvas, leather, rubber or other suitable material, the same being slidingly fitted along its opposite edges to the inner edges of the flanges 14 and 15, thus enabling said flexible apron or guard to slide around with the wheel and prevent the spokes from tearing or injuring the guard. The guard is sustained in working position by bowed reinforcing bands or straps 18 extending transversely thereof, as in Fig. 4, and adapted to carry rollers 19 which travel in grooves 19' in the outer sides of the flanges 15. The guard is provided at intervals with spoke orifices 20 from which slits extend outward to one edge of the guard as shown in Fig. 4 to enable the guard to be fitted to the spokes and fastened to the flanges and if desired, complemental fasteners 22 may be provided at opposite sides of the slits 21 to allow said slits to be closed and fastened to the guard when in place.

23 designates an air inlet or inflating passage which leads into the pressure equalizing passage 7 and said passage may be closed at its outer extremity by means of a suitable check valve 24, thus allowing for forcing air into the piston chamber and the equalizing passages under the desired pressure to form the necessary support for the wheel and the load imposed thereon.

If desired, a tread section 25 of any suitable material such as steel or rubber may be applied to the outer wearing face of the tire according to the desire of the manufacturer, the same being supported by a rim 13.

When there is no load on the inner section of the wheel, the inner and outer sections are in concentric relation and the air under compression in the cylinders of the outer section will hold the pistons inwardly against the bushings 11 that thus form stops for the pistons, and the piston stems or rods 10 are of such length that when the pistons engage the bushings 11, the inner ends of the stems will bear on the periphery of the inner section. When a load is placed on the inner section of the wheel, the said section will move downwardly and cause the piston 8 at the bottom of the wheel to move away from the bushing 11, but it will be observed that there will be no change in the position of the piston at the top of the wheel as the inner section of the wheel merely moves away from the stem 10 of such piston, which is, for the time being, at its extreme inner position. Obviously, when the piston at the bottom of the wheel moves, the air is compressed and forms a cushion.

Under the preferred embodiment of this invention certain of the pistons are formed as shown in the enlarged view, Fig. 5. That is to say, the pistons are provided with central bores 26 which lead entirely through the piston and through the rod thereof, the inner end of the bore being normally held closed by means of a foot check valve 27. Mounted to reciprocate in the bore 26 is a hollow or tubular plunger 28, the inner end of which extends beyond the inner end of the piston rod 10 and bears against the inner tire 4 above referred to. In order to insure the admission of air to the hollow plunger 28, the inner extremity of said plunger is notched as shown at 29 where it bears against the inner tire 4. At the outer end of the tubular plunger 28 is another plunger valve 30 which opens as the plunger moves inward and thereby admits air to the space between the valves 27 and 30, the valve 27 opening in the inward movement of the piston and closing automatically in the outward movement thereof, the device thus acting as an air compressor for compressing air in the piston chambers 6 and the equalizing passages 7. At one side the hollow plunger 28 is provided with a guide pin or key 31 which works in a spring containing pocket or groove 32 in the piston rod 10. A plunger spring 33 is arranged in the pocket 32 and exerts its pressure against the pin 31 to retract or thrust the hollow plunger 28 inward or toward the center of the wheel.

34 designates the plug held in place by a screw 35 or its equivalent to retain the spring 33 in place and limit the inward movement of the pin 31 and thereby the corresponding movement of the plunger 28.

37 designates a pressure regulating piston mounted in a small piston chamber in the outer face of the piston 8. Behind the piston 37 is a back spring 38 and back of the spring is a spring seat 39 in the form of a disk against the center of which bears a pressure regulating screw 40 by the adjustment of which the spring 38 is made more or less compressed to resist to a greater or lesser degree the movement of the pressure regulating piston 37.

41 designates a stem which extends from the piston 37 through a guide opening in the piston rod 10 and is provided at its extremity with a wedge 42 which operates on a transversely extending slide or latch pin 43. This latch pin 43 is adapted to enter a notch 44 in the adjacent side of the hollow plunger 28 when said plunger is at the outward limit of its movement, as will be readily understood from Fig. 5. The notch 44 is rounded so as to pass the pin 43 outward when pressure forces the plunger 28 inward.

It is also within the scope of this invention to provide the spokes as shown in Fig. 7 with central longitudinal air passages 45 while the inner tire 4 is also provided with a registering opening 46 communicating with the open end of the plunger 28. The passage 45 opens out laterally through the spoke at any suitable point as shown in Fig. 7 and receives a nipple 47 upon which is swiveled or loosely hung an air inlet nozzle 48, the receiving end of which usually hangs pendant so as to readily admit air while excluding dirt and water.

When the piston 8 is at the top of the wheel or farthest from the surface on which the wheel is resting, the wheel will not rest against it and the spring will throw the plunger 28 inward and air will enter the piston chamber through the hollow plunger and find its way past the valves 27 and 30. As the wheel turns and weight is brought to bear on the plunger 28, said plunger will move outward toward the tread surface of the tire and will force the piston outward thereby compressing air in the piston chamber, the air passing through the equalizing passages 7 and thereby obtaining an equal or uniform pressure of air through all the piston chambers and distributing passages. When the desired pressure is reached, the regulating piston 37 is forced against the action of the back spring 38 with a result that, through the coöperation of the wedge 42 and the latch pin 43, said plunger is locked thus preventing any further compression of air in the piston chambers. When the air pressure drops below a predetermined point which may be regulated by the strength of the spring 38, the pressure regulating piston 37 will move in the opposite direction under the stress of the spring 38 thereby releasing the latch pin 43 and allowing the plunger 28 to be thrown again in operation.

It will, of course, be understood that the tire may be made in various sizes, widths and diameters and the piston chambers may be made of a size commensurate with the weight to be imposed upon the wheel on which the tire is mounted and by means of the mechanism described any desired pressure may be obtained which is found necessary for the efficient support of the wheel and its load.

Lubricating oil may be introduced through the passage 23 hereinabove described so as to thoroughly lubricate the moving parts of the mechanism hereinabove described for the purpose of reducing wear thereon to a minimum and increasing the life and durability of the tire as a whole.

What is claimed is:—

1. A wheel comprising two non-yielding concentric sections spaced apart, cylinders in one section connected together for holding an electric medium under pressure, pistons in the cylinders, and stems on the pistons extending out of the cylinders of the one section and engaging the other section, the piston stems being of such length that the side of every piston opposite from that on which the said medium acts will bear against the end of its cylinder when the two sections are in concentric relation.

2. A wheel comprising two non-yielding concentric sections, the inner section being of such external diameter as to be out of contact with the outer section throughout the normal range of eccentricity of the sections, cylinders in the outer section, pistons in the cylinders, stems on the cylinders of such length that all the stems are in contact with the inner section when the two sections of the wheel are in concentric relation, and conduits connecting the cylinders together whereby the pressure in all the cylinders is constantly equal.

3. A wheel comprising two non-yielding concentric sections, the inner section being of such external diameter as to be out of contact with the outer section throughout the normal range of eccentricity of the sections, cylinders in the outer section, pistons in the cylinders, stems on the cylinders of such length that all the stems are in contact with the inner section when the two sections of the wheel are in concentric relation, conduits connecting the cylinders together whereby the pressure in all the cylinders is constantly equal, and means at the sides of one section and extending over the sides of the other section for forming the sole means for preventing relative axial displacement of the sections and permitting relative eccentric movement of the sections.

4. A wheel comprising inner and outer annular sections, interconnecting cylinders in the outer section, pistons in the cylinders, inwardly-extending stems on the pistons having their inner ends only contacting with the periphery of the inner section whereby the inner section can be moved laterally from the outer section, and means for retaining the inner section within the outer section and preventing relative lateral movement of the sections.

5. A wheel comprising an inner section, an annular outer section, permanently communicating cylinders in the outer section, pistons in the cylinders, stems extending inwardly from the pistons to contact with the inner section when the sections are in concentric relation, and means for limiting the inward movement of the pistons to hold the stem of the piston at the top of the wheel out of contact with the inner section when the latter is eccentric to the outer section.

In testimony whereof I affix my signature in presence of two witnesses.

ALLEN R. WEAVER.

Witnesses:
 GEO. L. BEVENS,
 W. J. WARD.